US012278921B2

(12) United States Patent
Hong et al.

(10) Patent No.: US 12,278,921 B2
(45) Date of Patent: Apr. 15, 2025

(54) BLOCKCHAIN-BASED ROAMING TRANSACTION METHOD AND APPARATUS

(71) Applicant: Huawei Technologies Co., Ltd., Shenzhen (CN)

(72) Inventors: Jianan Hong, Shenzhen (CN); Yanping Zhang, Shenzhen (CN); Weihua Hu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 447 days.

(21) Appl. No.: 17/742,063

(22) Filed: May 11, 2022

(65) Prior Publication Data

US 2022/0272203 A1 Aug. 25, 2022

Related U.S. Application Data

(63) Continuation of application No. PCT/CN2020/127892, filed on Nov. 10, 2020.

(30) Foreign Application Priority Data

Nov. 11, 2019 (CN) ......................... 201911097222.9

(51) Int. Cl.

| | |
|---|---|
| ***H04M 11/00*** | (2006.01) |
| ***G06Q 20/38*** | (2012.01) |
| ***H04M 15/00*** | (2006.01) |
| ***H04W 4/24*** | (2018.01) |

(52) U.S. Cl.

CPC ...... *H04M 15/8038* (2013.01); *G06Q 20/389* (2013.01); *H04M 15/41* (2013.01); *H04W 4/24* (2013.01)

(58) Field of Classification Search

CPC .. H04M 15/8038; H04M 15/00; H04M 15/41; H04W 4/24; G06Q 20/389; G06Q 20/38

USPC .............................. 455/406, 432.1, 450, 509

See application file for complete search history.

(56) References Cited

U.S. PATENT DOCUMENTS

| | | | | |
|---|---|---|---|---|
| 5,408,519 | A | 4/1995 | Pierce et al. | |
| 10,699,340 | B2 * | 6/2020 | Gordon, III | G06Q 20/0658 |
| 11,164,254 | B1 * | 11/2021 | Gordon, III | H04L 9/50 |
| 11,625,783 | B1 * | 4/2023 | Gordon, III | G06Q 20/065 705/37 |

(Continued)

FOREIGN PATENT DOCUMENTS

| | | | |
|---|---|---|---|
| CN | 107027111 | A | 8/2017 |
| CN | 107995003 | A | 5/2018 |

(Continued)

OTHER PUBLICATIONS

Jens Groth et al., "One-Out-of-Many Proofs: Or How to Leak a Secret and Spend a Coin," EUROCRYPT 2015, Part II, LNCS 9057, 2015, 28 pages.

(Continued)

*Primary Examiner* — Marceau Milord

(74) *Attorney, Agent, or Firm* — Conley Rose, P.C.

(57) ABSTRACT

A blockchain-based roaming transaction method includes sending, by a first network device, a charging data record file to a second network device; publishing, by the first network device, a currency statement to a blockchain; and receiving, by the first network device feedback information of the charging data record file from the second network device.

20 Claims, 8 Drawing Sheets

CONT. FROM FIG. 4A
CONT. FROM FIG. 4A
CONT. FROM FIG. 4A
S405: Send the charging data record file and the storage address of the currency statement in the blockchain to the home operation device
S410: After completing the payment, generate corresponding completion information of the payment
S411: Send the generated completion information of the payment to the blockchain
S412: Perform validity review on the completion information of the payment
S413: After determining that the completion information of the payment is valid, synchronize the completion information of the payment of this time to an entire network
S414: Feed back the completion information of the payment to the roaming operation device
S415: Query the blockchain for a payment transaction corresponding to the first currency statement, and determine that a currency corresponding to the first currency statement is a valid currency

(56) References Cited

U.S. PATENT DOCUMENTS

| | | | | |
|---|---|---|---|---|
| 12,008,649 | B1 * | 6/2024 | Gordon, III | G06Q 20/3678 |
| 2015/0324764 | A1 * | 11/2015 | Van Rooyen | G06Q 20/02 705/69 |
| 2016/0012465 | A1 * | 1/2016 | Sharp | G06Q 20/321 705/14.17 |
| 2018/0096175 | A1 * | 4/2018 | Schmeling | G06F 1/3206 |
| 2018/0109541 | A1 * | 4/2018 | Gleichauf | H04W 12/06 |
| 2019/0180291 | A1 * | 6/2019 | Schmeling | G16H 20/10 |
| 2019/0340269 | A1 * | 11/2019 | Biernat | H04L 63/12 |
| 2020/0184556 | A1 * | 6/2020 | Cella | G06F 18/241 |
| 2020/0226268 | A1 * | 7/2020 | Zlotnick | H04L 9/0637 |
| 2020/0294128 | A1 * | 9/2020 | Cella | H04L 9/3239 |
| 2021/0248514 | A1 * | 8/2021 | Cella | G06V 20/20 |
| 2021/0273816 | A1 * | 9/2021 | Deery | G06F 21/645 |
| 2021/0342836 | A1 * | 11/2021 | Cella | H04L 9/3239 |
| 2022/0366494 | A1 * | 11/2022 | Cella | H04L 9/50 |
| 2022/0368682 | A1 * | 11/2022 | Verzun | G06F 21/606 |
| 2023/0115953 | A1 * | 4/2023 | Brock | G06Q 20/108 705/72 |

FOREIGN PATENT DOCUMENTS

| | | | |
|---|---|---|---|
| CN | 108471601 | A | 8/2018 |
| CN | 109451451 | A | 3/2019 |
| CN | 109462618 | A | 3/2019 |
| CN | 110324817 | A | 10/2019 |
| KR | 20180069470 | A | 6/2018 |

OTHER PUBLICATIONS

Reuben Yap, “What is Sigma and why is it replacing Zerocoin in Zcoin?,” Mar. 20, 2019, 6 pages.

Ian Miers et al., “Zerocoin: Anonymous Distributed E-Cash from Bitcoin,” 2013 IEEE Symposium on Security and Privacy, 15 pages.

* cited by examiner

BLOCKCHAIN-BASED ROAMING TRANSACTION METHOD AND APPARATUS

CROSS-REFERENCE TO RELATED APPLICATIONS

This is a continuation of International Patent Application No. PCT/CN2020/127892 filed on Nov. 10, 2020, which claims priority to Chinese Patent Application No. 201911097222.9 filed on Nov. 11, 2019. The disclosures of the aforementioned applications are hereby incorporated by reference in their entireties.

TECHNICAL FIELD

This application relates to the field of communication technologies, and in particular, to a blockchain-based roaming transaction method and apparatus.

BACKGROUND

In a communication process, a roaming service is often involved. To be specific, a terminal device moves from a resident service area (that is, a subscribed service area) to a communication network in another service through roaming. A service area other than a subscription service area of the terminal device may be referred to as a roaming service area. A communication network provided by an operator in the subscription service area may be referred to as a subscription network for short, and a communication network provided by the operator in the roaming service area may be referred to as a roaming area network for short.

Similarly, when the terminal device performs the roaming service, a roaming operation device of an operator of the roaming area network may further charge, based on a charging data record file generated when the terminal device performs communication in the roaming area network, a roaming fee from an operator of the subscription area network corresponding to the terminal device. The operator of the subscription area network may be referred to as a home operation device for short, and the operator of the roaming area network may be referred to as a roaming operation device for short.

A process of roaming and roaming fee settlement between operators includes three stages: before roaming, during roaming, and after roaming. Before roaming, the operators establish a roaming relationship, exchange a roaming agreement, and publish roaming-related public parameters. In this process, the home operation device obtains a charging agreement of the roaming operation device for the roaming service, and sets a user roaming tariff of a subscribed terminal device in a roaming process. In the roaming process, the terminal device roams after accessing the roaming area network, and the roaming operation device sends the charging data record file of the terminal device to the home operation device through a roaming financial settlement system. After roaming, the home operation device settles a roaming fee with the roaming operation device based on the charging data record file, and the home operation device settles a roaming retail fee with the terminal device based on the obtained charging data record file. Regardless of a roaming mode, charging data record settlement between the operators needs to be arbitrated and notarized by a trusted roaming clearing center.

A problem of the roaming service in the above communication process is that: in a roaming charging data record settlement system, a charging data record delay is measured in days, where call fee fraud utilizing a delay of the system may occur, and a lack of reliability and security caused by manual operations is inevitable. In addition, in a roaming service, charging data record settlement between operators needs to be arbitrated and notarized by a trusted roaming clearing center, and a roaming cost increase caused by dependence on arbitration is also a problem to be resolved.

SUMMARY

This application provides a blockchain-based roaming transaction method and apparatus, to resolve a problem that in a roaming service, charging data record settlement between operators needs to be arbitrated and notarized by a trusted roaming clearing center, and dependence on arbitration causes a roaming cost increase.

According to a first aspect, an embodiment of this application provides a blockchain-based roaming transaction method, including the following.

A first network device sends a charging data record file to a second network device. The charging data record file is a roaming communication record of a terminal device, and the first network device is located in a roaming area network of the terminal device. The first network device publishes a currency statement to a blockchain. The currency statement indicates a roaming fee corresponding to the charging data record file. The first network device receives feedback information of the charging data record file from the second network device.

Based on this solution, the first network device determines the charging data record file of the second network device, and then publishes, to the blockchain, the currency statement indicating the roaming fee corresponding to the charging data record file, so that the second network device performs a roaming transaction by using the blockchain without a third-party arbitration platform. This effectively reduces roaming transaction costs, and further effectively ensures traceability of the roaming transaction by using features such as tamper resistance and real-time recording of the blockchain.

In a possible implementation, before a first network device sends a charging data record file to a second network device, the first network device determines the charging data record file generated when the terminal device performs a roaming service.

In a possible implementation, before the first network device publishes a currency statement to a blockchain, the first network device determines the roaming fee corresponding to the charging data record file according to a roaming agreement signed with the second network device.

In a possible implementation, the currency statement is generated by the first network device based on the roaming fee by using a mintage process.

In a possible implementation, the currency statement further includes currency verification information, and the currency verification information corresponds to a unique currency statement and is used to determine whether payment for the currency statement in the blockchain is completed.

In a possible implementation, the first network device determines a charging data record statement based on the charging data record file, and the first network device publishes the charging data record statement and the currency statement to the blockchain.

In a possible implementation, the first network device signs the charging data record file, and determines the charging data record statement based on the signed charging data record file.

In a possible implementation, the first network device publishes the charging data record statement to the blockchain after encryption or hashing.

In a possible implementation, the first network device sends any one or more of the following to the second network device: feedback information of a charging data record of a previous round, a signature of the first network device, and an address of the currency statement in the blockchain.

In a possible implementation, the feedback information of the charging data record file indicates a check result of the charging data record file, and if it is checked that the charging data record file is valid, the feedback information of the charging data record file includes a signature of the second network device.

According to a second aspect, an embodiment of this application provides a blockchain-based roaming transaction method, including the following.

The second network device selects a first currency statement for payment. The first currency statement is a roaming fee to be paid by the second network device. The second network device completes the payment for the first currency statement. The second network device sends completion information of the payment to a first network device. The first network device is located in a roaming area network of a terminal device.

In a possible implementation, the second network device selects, based on a valid second currency statement held by the second network device, the first currency statement for the payment, where an amount of the first currency statement is less than or equal to that of the second currency statement, or selects the first currency statement from a plurality of currency statements.

In a possible implementation, after the second network device completes the payment for the first currency statement, the second network device sends the completion information of the payment to a blockchain.

In a possible implementation, before the second network device selects a first currency statement for payment, the second network device receives a storage address of the first currency statement in the blockchain from the first network device.

In a possible implementation, the second network device selects the first currency statement for the payment from the blockchain based on the received storage address.

In a possible implementation, the second network device further sends a storage address of the completion information of the payment in the blockchain to the first network device.

In a possible implementation, the completion information of the payment indicates that the second network device completes the payment for the first currency statement, and the completion information of the payment includes a transaction address for performing payment by the second currency statement.

According to a third aspect, an embodiment of this application provides a communication apparatus. The communication apparatus has a function of implementing the network device in the foregoing embodiment. The function may be implemented by hardware, or may be implemented by hardware executing corresponding software. The hardware or the software includes one or more units or modules corresponding to the foregoing function.

In a possible implementation, the communication apparatus may be a first network device in a roaming area network, or a component that can be used for the first network device, for example, a chip, a chip system, or a circuit. The communication apparatus may include a transceiver and a processor. The processor may be configured to support the communication apparatus in performing a corresponding function of the first network device. The transceiver is configured to support the communication apparatus in communicating with another network device (for example, a second network device), a server (for example, a blockchain), and the like. Optionally, the communication apparatus may further include a memory, and the memory may be coupled to the processor, and stores program instructions and data that are necessary to the communication apparatus. The transceiver may be an independent receiver, an independent transmitter, a transceiver integrated with a receiving/transmission function, or an interface circuit.

In another possible implementation, the communication apparatus may be a second network device in a subscription area network, or a component that can be used for the second network device, for example, a chip, a chip system, or a circuit. The communication apparatus may include a transceiver and a processor. The processor may be configured to support the communication apparatus in performing a corresponding function of the second network device. The transceiver is configured to support the communication apparatus in communicating with another network device (the first network device), a terminal device, and the like. Optionally, the communication apparatus may further include a memory, and the memory may be coupled to the processor, and stores program instructions and data that are necessary to the communication apparatus. The transceiver may be an independent receiver, an independent transmitter, a transceiver integrated with a receiving/transmission function, or an interface circuit.

According to a fourth aspect, an embodiment of this application provides a communication apparatus configured to implement any one of the first aspect or the second aspect, or any one of the methods in the first aspect or the second aspect.

In a possible implementation, when the communication apparatus is a first network device in a roaming area network, the communication apparatus may include a processing unit and a communication unit.

The communication unit is configured to send a charging data record file to a second network device. The charging data record file is a roaming communication record of a terminal device, and a first network device is located in a roaming area network of the terminal device.

The processing unit is used by the first network device to publish a currency statement to a blockchain. The currency statement indicates a roaming fee corresponding to the charging data record file.

The communication unit is configured to receive feedback information of the charging data record file from the second network device.

In a possible implementation, when the communication apparatus is a second network element in a subscription area network, the communication apparatus may include a processing unit and a communication unit.

The processing unit is configured to select a first currency statement for payment, where the first currency statement is a roaming fee to be paid by a second network device, and complete the payment for the first currency statement.

The communication unit is configured to send completion information of the payment to a first network device. The first network device is located in a roaming area network of a terminal device.

According to a fifth aspect, an embodiment of this application provides a communication system. The communication system includes a network device in a roaming area network, a network device in a subscription area network, a terminal device, a blockchain, and a data server. The network device in the roaming area network may be configured to perform any one of the first aspect or the second aspect, or perform any one of the methods in the first aspect or the second aspect.

The network device in the subscription area network may be configured to perform any one of the first aspect or the second aspect, or perform any one of the methods in the first aspect or the second aspect.

According to a sixth aspect, this application provides a chip system, including a processor. Optionally, the system may further include a memory. The memory is configured to store a computer program. The processor is configured to invoke the computer program from the memory and run the computer program, a communication apparatus on which the chip system is installed is enabled to perform any one of the first aspect or the second aspect, or perform any one of the methods in the first aspect or the second aspect.

According to a seventh aspect, an embodiment of this application provides a computer storage medium. The computer storage medium stores instructions, and when the instructions are run on a communication apparatus, the communication apparatus is enabled to perform any one of the first aspect or the second aspect, or perform any one of the methods in the first aspect or the second aspect.

According to an eighth aspect, an embodiment of this application provides a computer program product including instructions. When the computer program product is run on a communication apparatus, the communication apparatus is enabled to perform any one of the first aspect or the second aspect, or perform any one of the methods in the first aspect or the second aspect.

DESCRIPTION OF EMBODIMENTS

Figure 1:
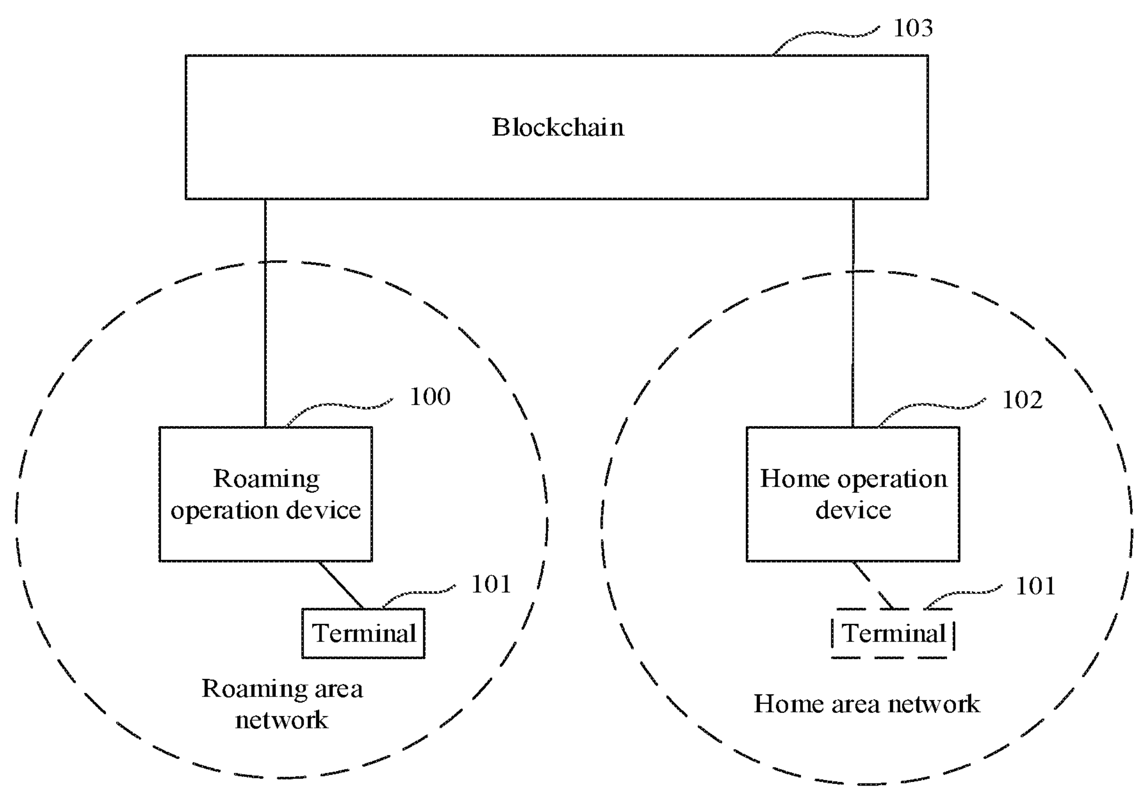
FIG. 1 is a diagram of an architecture of a communication system according to this application.

The following describes in detail a specific implementation process of the embodiments of this application with reference to the accompanying drawings.

In a communication process, a roaming service is often involved, to be specific, a roaming operation device in a roaming area network provides a roaming charging data record of a terminal device for a home operation device in a subscription area network, and charges a roaming fee. A roaming and settlement process between the roaming operation device and the home operation device includes three stages: before roaming, during roaming, and after roaming. Before roaming, the roaming operation device and the home operation device establish a roaming relationship, exchange a roaming agreement, and publish various roaming-related public parameters. In this process, the home operation device obtains a roaming fee that is determined according to the roaming agreement and that is sent by the roaming operation device, and sets a roaming retail fee of subscribed user equipment (UE) in a roaming process based on the roaming fee and an operation cost of the home operation device. During roaming, the UE accesses a service in the roaming area network and generates roaming, and the roaming operation device sends a roaming charging data record of the UE to the home operation device by using a roaming financial settlement system. After roaming, the home operation device settles the roaming fee with the roaming operation device based on a roaming charging data record file, and the home operation device settles the roaming retail fee with the corresponding UE based on the obtained roaming charging data record. Regardless of a roaming mode, charging data record settlement between operators needs to be arbitrated and notarized by a trusted roaming clearing center.

A problem in a roaming charging data record settlement system is that a charging data record delay is measured in days, where call fee fraud utilizing a delay of the system may occur, and a lack of reliability and security caused by manual operations is inevitable. In addition, charging data record settlement between the operators needs to be arbitrated and notarized by a trusted roaming clearing center, and a roaming cost increase caused by dependence on arbitration is also a problem to be resolved.

Further, with continuous development of a blockchain technology, based on features such as tamper resistance of a blockchain distributed ledger technology, in a communication process, efforts are gradually made to build a secure roaming charging data record settlement platform based on a blockchain, to resolve problems such as a high cost, a high delay, and financial fraud of a loose roaming settlement system in a telecommunication network system.

However, in a blockchain, a privacy issue brought by the blockchain does not exist in an architecture. For example, a blockchain payment platform represented by Bitcoin needs to clearly indicate accounts and transaction amounts of both transaction parties in a transaction, so that roaming charging data record information is visible to all entities, and privacy of both parties of a roaming transaction cannot be ensured. This is obviously unacceptable to both parties of the roaming transaction.

To resolve this problem, the embodiments of this application provide a method for supporting a roaming service based on a blockchain. The technical solutions of the embodiments of this application may be applied to various communication systems, for example, a Long-Term Evolution (LTE) system, a Worldwide Interoperability for Microwave Access (WIMAX) communication system, a future 5th generation (5G) system such as a New Radio (NR) access technology, and a future communication system such as a sixth generation (6G) system.

A 5G system (or an NR system) is used as an example. Further, to ensure privacy of both transaction parties, a zero-knowledge proof (ZKP) technology is mainly used in a method for performing a roaming service based on a blockchain technology. According to the method, transfer information between the roaming operation device and the home operation device can be hidden, so that a payment behavior of the roaming transaction cannot be tracked.

For ease of understanding the embodiments of this application, a communication system shown in FIG. 1 is first used as an example to describe in detail a communication system to which the embodiments of this application are applicable. As shown in FIG. 1, the communication system includes a roaming operation device 100, a terminal device 101, a home operation device 102, and a blockchain 103.

The roaming operation device 100 is located in a roaming area network. In the communication system, a device configured to provide a wireless communication function for the accessed terminal device 101 in the roaming are network may determine a roaming service fee generated when the home operation device 102 corresponding to the terminal device 101 performs a roaming service, and notify and charge the home operation device 102 of the roaming service fee. The roaming operation device 100 may also be referred to as a base station (BS). Some examples of the roaming operation device 100 includes a gNodeB (gNB) in 5G, an evolved NodeB (eNB), a Radio Network Controller (RNC), a NodeB (NB), a base station controller (BSC), a base transceiver station (BTS), a home base station (for example, a home evolved nodeB or a home node B (HNB)), a baseband unit (BBU), a transmission reception point (TRP), a transmitting point (TP), a mobile switching center, and the like.

Figure 2:
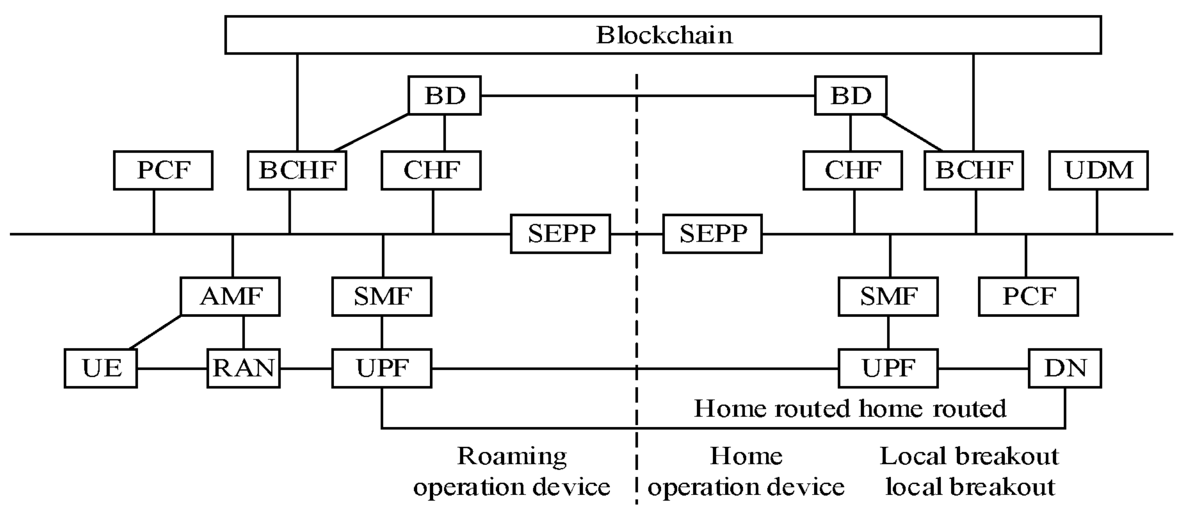
FIG. 2 is a diagram of an architecture of another communication system according to this application.

Further, as shown in FIG. 2, network elements included in the roaming operation device 100 mainly include a session management function (SMF), an access and mobility management function (AMF), a charging function (CHF), a billing domain (BD), a blockchain handling function (BCHF), a security edge protection agent (SEPP), a policy control function (PCF), a user port function (UPF), a radio access network (RAN), and the like.

The SMF is mainly configured to send a charging data record to the CHF in a roaming communication service. The CHF is configured to consolidate a charging data record file of a current time segment based on a plurality of bills provided by the SMF and according to a roaming agreement negotiated between the roaming operation device and the home network device 102, and send the charging data record file to the BD. The BD is a settlement center of the roaming operation device, and may directly query the blockchain 103, or may be transferred by using the blockchain handling function BCHF. The BD is mainly used to determine the roaming fee corresponding to the charging data record file, and generate, by using an initial mintage process, a currency statement same as a roaming fee limit. The BCHF is configured to establish a connection between the roaming operation device 100 and the blockchain 103, so that the roaming operation device can store information such as a transaction record and the currency statement in the blockchain, obtain related information from the blockchain, perform a processing operation on corresponding information in the blockchain, and the like.

The roaming operation device may also be referred to as a first network device. In other words, the first network device may be one or more network elements in the roaming area network, or may be one or more functional modules in the roaming area network. A specific form and structure of the first network device are not limited in this embodiment of this application.

It should be noted that in this embodiment of this application, the BD may alternatively be a computing device, and query and access to the blockchain are transferred by using the BCHF.

The terminal device 101 is a device that provides voice and/or data connectivity for a user, and may also be referred to as a UE, an access terminal, a subscriber unit, a subscriber station, a mobile station, a remote station, a remote terminal, a mobile device, a user terminal, a terminal, a wireless communication device, a user agent, or a user apparatus. The terminal in the embodiments of this application may be a mobile phone, a tablet (or IPAD), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The home operation device 102 is located in a subscription area network. In the communication system, a device configured to provide a wireless communication function for the accessed terminal device 101 in the subscription area network may calculate the roaming service fee that is generated when the terminal device 101 performs the roaming service and that is sent by the roaming operation device 100, pay the roaming service fee to the roaming operation device 100 after determining that the roaming service fee is correct, and set and charge the roaming service fee of the terminal device 101. The home operation device 101 may also be referred to as a base station (BS). Some examples of the home operation device 101 includes a gNB in 5G, an eNB, an RNC, an NB, a BSC, a BTS, an HNB, a BBU, a TRP, a TP, a mobile switching center, and the like.

Further, as shown in FIG. 2, network elements included in the home operation device 102 mainly include an SMF, a CHF, a BD, a BCHF, an SEPP, a PCF, a UPF, a unified data management (UDM), a downstream node (DN), and the like. In a roaming communication service, the SMF is mainly configured to send a charging data record to the CHF. The CHF is configured to consolidate a call detail record file of a current time segment based on a plurality of bills provided by the SMF and a roaming agreement negotiated between the roaming operation device and the roaming operation device 100, and send the charging data record file of the current time segment to the BD. The BD is a settlement center of the home operation device 102, may directly query the blockchain 103, or may be transferred by using the blockchain handling function BCHF, and is mainly used to perform charging data record verification by querying the blockchain 103. The BCHF is configured to establish a connection between the home operation device 102 and the blockchain 103, so that the home operation device can obtain related information from the blockchain, perform charging data record verification, perform another processing operation on corresponding information in the blockchain, and the like.

The home operation device may also be referred to as a second network device. In other words, the second network device may be one or more network elements in the subscription area network, or may be one or more functional modules in the subscription area network. A specific form and structure of the second network device are not limited in this embodiment of this application.

It should be noted that in this embodiment of this application, the BD may alternatively be a computing device, and query and access to the blockchain are transferred by using the BCHF. The blockchain 103 is a secure implementation of a distributed ledger, uses a block as a data structure to store transaction information, and each block includes a block body and a block header. The block body stores a transaction record. Based on a requirement of an application scenario in an implementation of this embodiment of this application, the transaction record may be a transfer record, a smart contract record, a clearing record, a data record, or the like. The block header stores a timestamp, a hash summary result of a transaction, and necessary information for forming a chain structure with a preceding block and the block header.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems. It should be understood that FIG. 1 and FIG. 2 are merely simplified schematic diagrams of examples for ease of understanding. The communication system may further include another network device or may further include another terminal, which is not shown in FIG. 1 and FIG. 2.

Some terms in the embodiments of this application are explained and described below for ease of understanding.

(1) Zcoin is a technology. In Zcoin, a currency holding manner is to record a random number representing a fixed value in a blockchain, that is, a currency statement in this embodiment of this application, and a holder secretly stores a sequence number and a logical relationship behind the random number. During payment, the holder presents the sequence number and declares that the sequence number has a logical relationship with a currency statement recorded in the blockchain by using a ZKP. However, the ZKP does not expose the currency statement in the process. To be specific, Zcoin can use a currency with a fixed value as a unit. A user owns a currency in the blockchain in an open or anonymous manner and uses the currency to pay a fee in a hidden manner. This feature effectively protects transfer account privacy during a transaction.

A currency with a fixed value includes two parameters in Zcoin: a currency statement published to the blockchain and a privacy sequence number of a currency holder, and the currency statement may be determined by using the privacy sequence number of the currency holder and another parameter. For example, it is assumed that the currency statement is a currency statement C and the privacy sequence number of the currency holder is S. There is a random hidden value r, so that a public operation of (S, r) can derive C.

In this embodiment of this application, for ease of description, the currency statement and the two parameters S and r corresponding to the currency statement are collectively referred to as statement information, and the two parameters S and r are represented as currency verification information. To be specific, in this embodiment of this application, the statement information represents (C, S, r), the currency statement represents C, and the currency verification information represents (S, r).

In this embodiment of this application, the privacy sequence number S and the random hidden value r that correspond to the currency statement C may be securely stored in a BD corresponding to the holder, and for security, an external read access interface for S and r is not provided in any form.

Optionally, in this embodiment of this application, another network element such as a charging function CHF or a blockchain handling function BCHF is allowed to securely manage these anonymous currencies.

(2) Mintage mainly includes two aspects in this embodiment of this application. The roaming operation device generates a currency statement of a corresponding amount by using an initial mintage process based on a roaming fee generated by a roaming service in a specific round. The currency statement may be a combination of a plurality of currency statements with different values. For example, a first currency statement may be a combination of a currency statement 1, a currency statement 2, and a currency statement 3.

The roaming operation device stores the currency statement in the blockchain, securely stores the currency verification information in a BD of the roaming operation device, until the home operation device completes payment for the currency statement in a future payment process, and determines to complete mintage. In other words, a mintage process is mainly a process of generating an invalid currency, and then making the invalid currency become a valid currency after payment is completed.

Optionally, in this embodiment of this application, to ensure uniqueness of S in the generated statement information, the roaming operation device may query, when ensuring that S is not exposed, whether a corresponding sequence number exists in the blockchain. If the corresponding sequence number exists, the roaming operation device generates new S, and then may continue to verify uniqueness of S until generated S is unique.

(3) In this embodiment of this application, a valid currency mainly refers to a currency corresponding to the currency statement C that is stored in the blockchain and that can be used by the holder for payment.

(4) In this embodiment of this application, an invalid currency mainly refers to a currency that is stored in the blockchain and that has been paid (consumed) by the holder and that has not been successfully minted (not activated yet).

In addition, the term "at least one" in the embodiments of this application means one or more, and "a plurality of" means two or more. The term "and/or" describes an association relationship between associated objects and represents that three relationships may exist. For example, A and/or B may represent the following three cases: only A exists, both A and B exist, and only B exists. A and B may be in a singular or plural form. The character "/" generally indicates an "or" relationship between the associated objects. "At least one of the following" or a similar expression thereof indicates any combination of these items, including a single item or any combination of a plurality of items. For example, at least one of a, b, or c may indicate: a, b, c, a and b, a and c, b and c, or a, b, and c, where a, b, and c may be singular or plural.

Unless otherwise status, ordinal numbers such as "first" and "second" mentioned in the embodiments of this application are intended to distinguish a plurality of objects, rather than limit an order, a time sequence, priorities, or importance degrees of the plurality of objects.

In addition, the terms "include/comprise" and "have" in the embodiments, claims, and accompanying drawings of this application are not exclusive. For example, a process, method, system, product, or device including a series of steps or modules is not limited to the listed steps or modules, and may further include a step or module that is not listed.

With reference to the accompanying drawings, the following describes a method for supporting a roaming service based on a blockchain provided in this application in three phases: before a roaming transaction, during a roaming transaction, and after a roaming transaction.

Phase 1: Before Roaming.

In this embodiment of this application, before a roaming operation device performs a roaming transaction with a home operation device, the roaming operation device and the home operation device need to determine a roaming agreement for performing the roaming transaction and other necessary information. The roaming agreement is used to determine a roaming fee corresponding to a charging data record file, that is, the roaming operation device determines, based on the roaming agreement, a roaming fee of the charging data record file generated on a roaming network by a terminal device corresponding to the home operation device. In addition, the home operation device may further verify, according to the roaming agreement, accuracy of the roaming fee corresponding to the charging data record file sent by the roaming operation device.

In this embodiment of this application, the roaming agreement signed between the roaming operation device and the home operation device may be stored in a plurality of manners, which are not limited to the following several manners.

Storage manner 1: The roaming agreement is stored in a blockchain, and the roaming operation device and the home operation device may obtain the roaming agreement based on a storage address of the roaming agreement in the blockchain.

Storage manner 2: The roaming agreement may be stored in the roaming operation device and the home operation device respectively, and the roaming operation device and the home operation device may obtain the roaming agreement locally respectively.

In this embodiment of this application, the roaming operation device and the home operation device may negotiate the roaming agreement in a plurality of manners, which are not limited to the following several manners.

Figure 3:
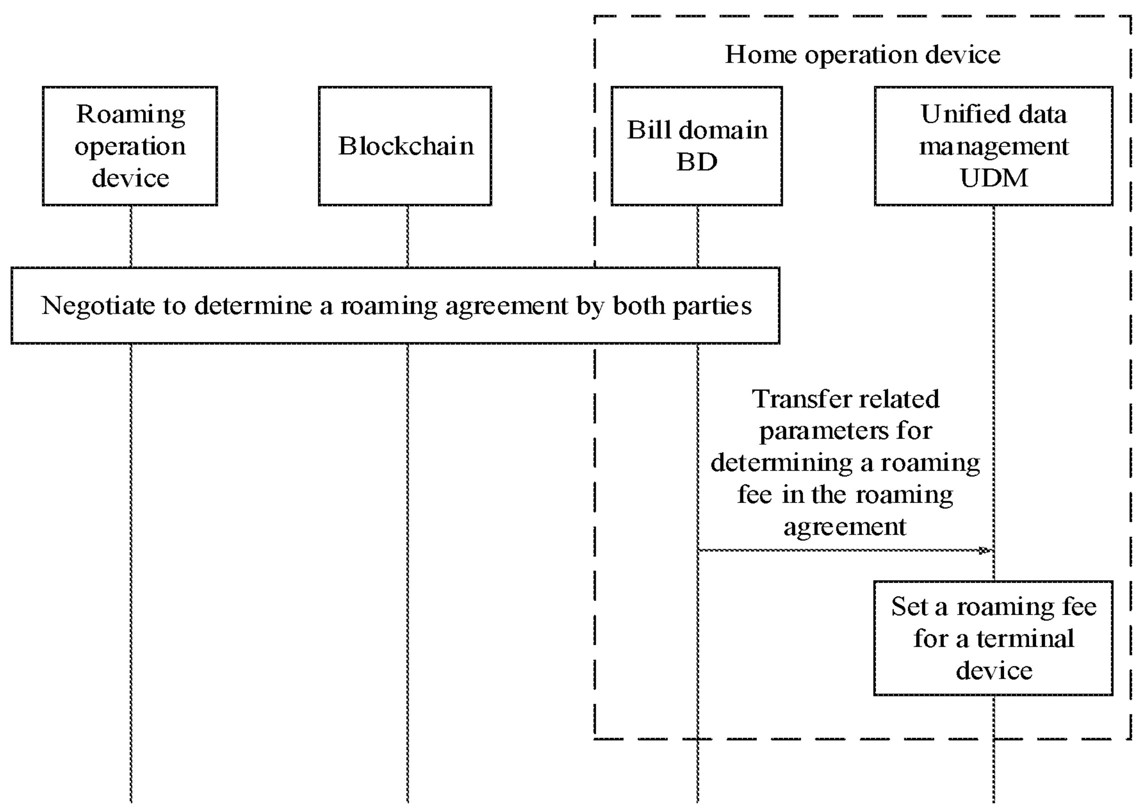
FIG. 3 is a schematic diagram in which a roaming operation device and a home operation device jointly determine a roaming agreement according to this application.

Negotiation manner 1: As shown in FIG. 3, the roaming agreement is formulated by the roaming operation device and the home operation device.

For example, after the roaming operation device and the home operation device jointly negotiate to determine the roaming agreement, the roaming agreement is recorded in plaintext in the blockchain.

The roaming agreement is attached with a double signature of the roaming operation device and the home operation device, and the double signature attached to the roaming agreement is used to determine that both signing parties acknowledge a specification of the roaming agreement. For example, if a double signature attached to a roaming agreement 1 is signatures of a roaming operation device A and a home operation device B, it is determined that the roaming operation device A and the home operation device B both agree with a specification in the roaming agreement 1.

Therefore, when a roaming service is generated between the roaming operation device A and the home operation device B, and a roaming fee needs to be determined, the roaming operation device A determines, according to the roaming agreement 1, the roaming fee that needs to be paid by the home operation device, and the home operation device B may account, according to the roaming agreement 1, the roaming fee corresponding to the roaming service.

In this embodiment of this application, in negotiation manner 1, to effectively enhance security of the roaming service, the double signature of the roaming operation device and the home operation device attached to the roaming agreement may be encrypted. In other words, the roaming operation device and the home operation device corresponding to the roaming agreement can be determined after the encrypted double signature are decrypted, which can effectively ensure security of the roaming service.

Further, in this embodiment of this application, a signature key used to decrypt the encrypted double signature may be securely recorded in the blockchain by using a BCHF, or a signature key used to decrypt the encrypted double signature may be stored in respective bill fields BDs corresponding to each of the operation devices.

Further, in the roaming service, if the roaming agreement is stored in plaintext on a third-party platform, for example, the blockchain, another device may obtain the roaming agreement. Consequently, a security risk is caused. To resolve this problem, in this embodiment of this application, after the roaming operation device and the home operation device jointly determine the roaming agreement, the roaming agreement is hashed or encrypted, and then a hash result of the roaming agreement or an encrypted roaming agreement is stored in the blockchain.

It should be noted that, in this embodiment of this application, both the roaming operation device and the home operation device may hash or encrypt the roaming agreement, and a result obtained after the roaming operation device hashes or encrypts the roaming agreement is the same as a result obtained after the home operation device hashes or encrypts the roaming agreement. Therefore, a device that hashes or encrypts the roaming agreement is not limited in this embodiment of this application.

Similarly, in this embodiment of this application, both the roaming operation device and the home operation device may hash or encrypt the double signature, and a result obtained after the roaming operation device hashes or encrypts the double signature is the same as a result obtained after the home operation device hashes or encrypts the double signature. Therefore, a device that hashes or encrypts the double signature is not limited in this embodiment of this application.

The roaming agreement may be attached with the double signature of the home operation device and the roaming operation device. In this embodiment of this application, to effectively protect security of the roaming agreement and the double signature that are stored in the blockchain, there may be a plurality of operation manners, which are not limited to the following several manners.

Operation manner 1: A roaming agreement A is hashed or encrypted to obtain a roaming agreement A', the double signature of the home operation device and the roaming operation device is hashed or encrypted to obtain a double signature A', and the roaming agreement A' attached with the double signature A' is stored in the blockchain.

In this embodiment of this application, determining the roaming agreement A' and determining the double signature A' is not subject to a specific sequence. For example, in this embodiment of this application, both the roaming agreement A' and the double signature A' may be determined, the roaming agreement A' may be determined before the double signature A' is determined, or the double signature A' may be determined before the roaming agreement A' is determined.

Operation manner 2: The roaming agreement A and the double signature are hashed or encrypted together, to obtain a hash result or an encryption result of the roaming agreement and the double signature as a whole, and then the hash result or the encryption result is stored in the blockchain.

In this embodiment of this application, if the roaming agreement is hashed, and the hash result is stored in the blockchain, the roaming operation device and the home operation device store the roaming agreement.

In this embodiment of this application, if the roaming agreement is encrypted, the roaming operation device and the home operation device securely store, in their respective BDs, keys used to decrypt the encryption result.

Negotiation manner 2: The roaming agreement is independently formulated by the roaming operation device, and is recorded in the blockchain corresponding to the roaming operation device and the home operation device, or the roaming agreement is independently formulated by the home operation device, and is recorded in the blockchain corresponding to the home operation device and the roaming operation device. An operation device that does not formulate the roaming agreement determines, based on its own situation, whether to invoke the roaming agreement to establish a roaming relationship with the other device.

The home operation device or the roaming operation device may record the roaming agreement in the blockchain by using a BCHF of the home operation device, and the roaming agreement stored in the blockchain is attached with a signature of a formulator. For example, if the roaming agreement is formulated by the home operation device, the roaming agreement stored in the blockchain is attached with a signature of the home operation device.

For example, it is assumed that the roaming agreement is independently formulated by the home operation device, and the roaming agreement is stored in the blockchain. When the roaming operation device and the home operation device need to perform the roaming service, the roaming operation device may obtain, from the blockchain, the roaming agreement stored in the home operation device, and determine, according to the roaming agreement, the roaming fee generated when the home operation device performs the roaming service.

The roaming operation device may obtain the roaming agreement from the blockchain based on the storage address of the roaming agreement that is in the blockchain and that is sent by the home operation device when the roaming service needs to be performed, to be specific, the storage address of the roaming agreement that is in the blockchain and that is obtained by the roaming operation device is sent by the home operation device to the roaming operation device when the roaming service needs to be performed. Alternatively, the roaming operation device obtains the roaming agreement from the blockchain based on the storage address of the roaming agreement agreed upon with the home operation device in advance. To be specific, the roaming operation device and the home operation device agree in advance that the roaming agreement is formulated by the home operation device, and the home operation device notifies the roaming operation agreement of the storage address of the roaming agreement in the blockchain in advance. Then, when the roaming service is performed, the roaming operation device may directly obtain the roaming agreement based on the storage address of the roaming agreement in the blockchain agreed in advance.

In this embodiment of this application, in negotiation manner 2, to effectively enhance security of the roaming service, a roaming agreement B may be encrypted to obtain a roaming agreement B', and a single signature of the home operation device or the roaming operation device is hashed or encrypted to obtain a single signature B'. Then, the roaming agreement B' attached with the single signature B' is stored in the blockchain. It should be noted that in this embodiment of this application, determining the roaming agreement B' and determining the unilateral signature B' are not subject to a specific sequence.

Further, in this embodiment of this application, the roaming operation device and/or the home operation device securely store, in their respective BDs, the key used to decrypt the encryption result.

Further, in this embodiment of this application, regardless of a negotiation manner, after the roaming operation device and the home operation device determine the roaming agreement used for performing the roaming transaction, roaming tariff information in a roaming transaction process is determined between the home operation device and the roaming operation device according to the roaming agreement. The roaming operation device may determine, for different types of UEs according to the roaming agreement, network assurance that needs to be provided, and may further determine, according to the roaming agreement, a format of a roaming charging data record provided to the home operation device.

Further, the home operation device determines, based on parameter information that is used to determine the roaming fee and that is in the roaming agreement, a roaming fee standard provided by the roaming operation device for the home operation device, to set corresponding roaming retail tariffs or roaming call fee packages for the different types of UEs based on operating costs of the home operation device.

In an implementation of this embodiment of this application, as shown in FIG. 3, the BD in the home operation device transfers, to UDM in the home operation device, a parameter that is in the roaming agreement and that is used to determine the roaming fee. The UDM determines, based on the parameter information, the roaming fee standard provided by the roaming operation device for the UDM, to set corresponding roaming retail tariffs or roaming call fee packages for the different types of UE based on operating costs of the UDM.

In this embodiment of this application, the signature and/or the roaming agreement are/is protected in a hash manner, so that information can be hidden more simply and efficiently. In addition, because a hash algorithm is secure and can be disclosed, when some files need to be obtained, security and privacy of remaining files are not affected.

Phase 2: During Roaming.

Figure 4A:
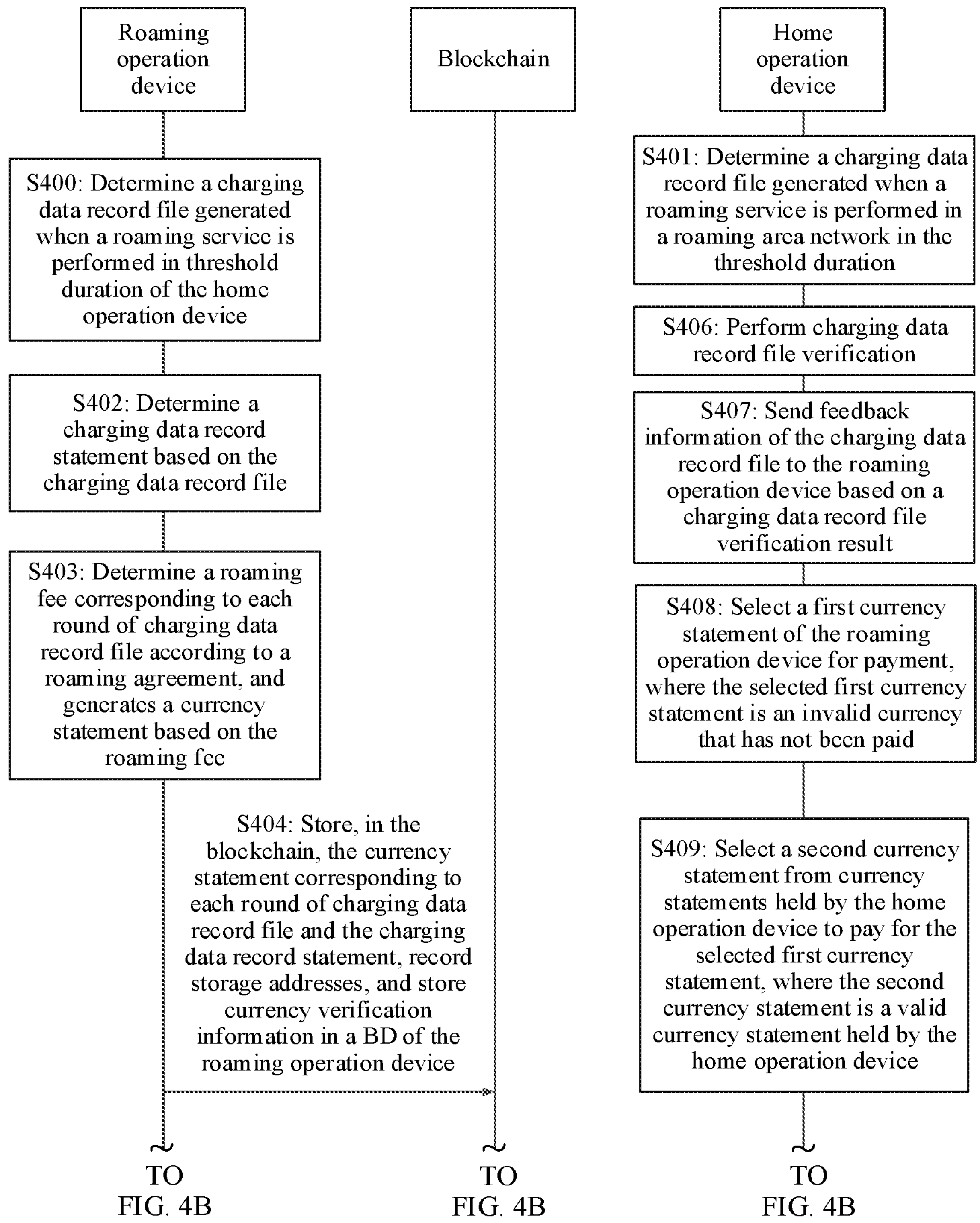
FIG. 4A and FIG. 4B is a schematic flowchart in which a roaming operation device and a home operation device perform a roaming transaction according to this application.
Figure 4B:
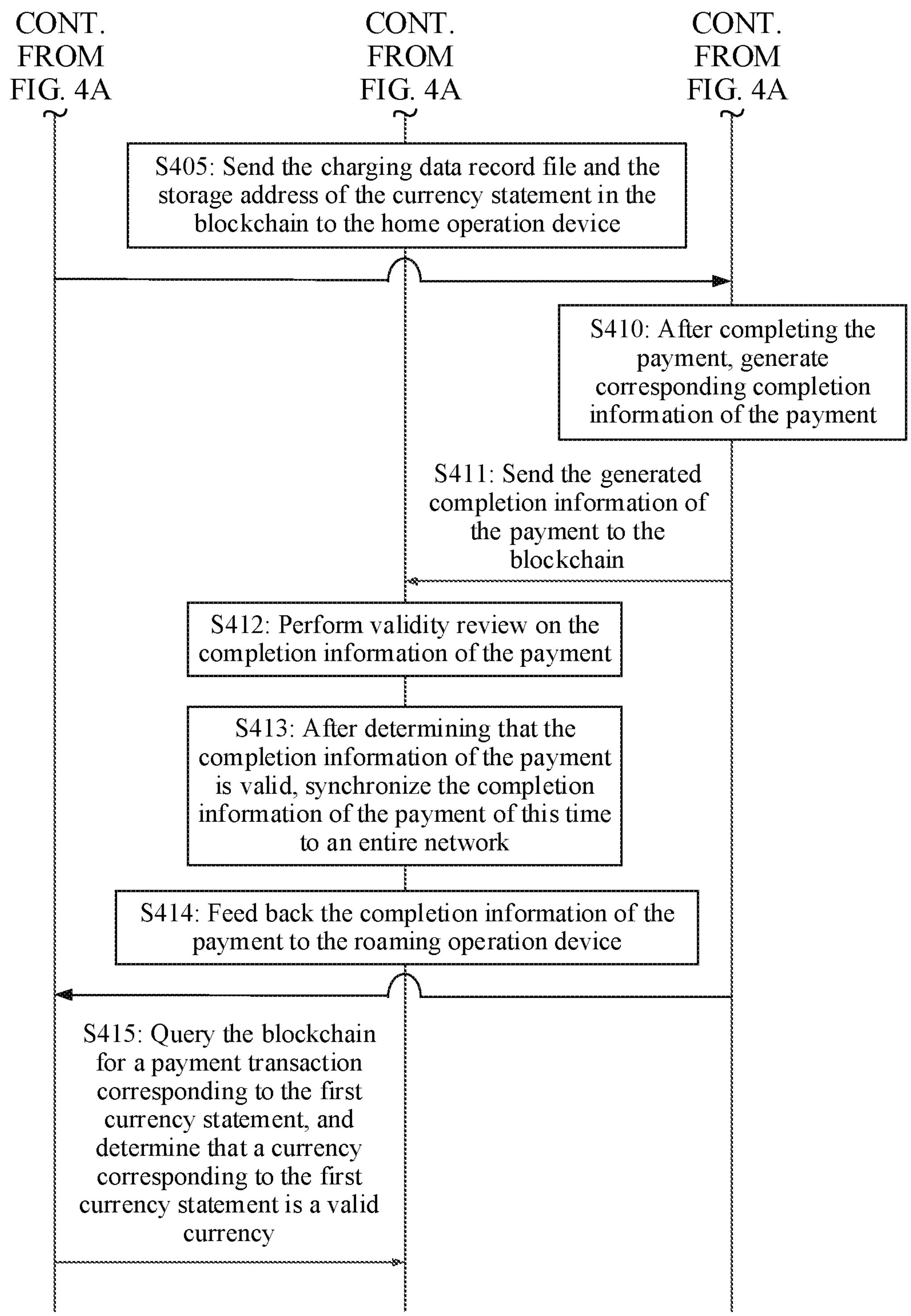

In this embodiment of this application, in a roaming process of a roaming operation device and a home operation device, a specific interaction procedure between the roaming operation device and the home operation device may be shown in FIG. 4A and FIG. 4B, and includes the following steps.

S400: The roaming operation device determines a charging data record file generated when a roaming service is performed in threshold duration of the home operation device.

In an implementation of this embodiment of this application, the home operation device may generate at least one round of charging data record file at a roaming area in the threshold duration, and correspondingly, the roaming operation device may determine, based on each round of charging data record file, a roaming fee corresponding to the charging data record file.

For example, it is assumed that the threshold duration in this embodiment of this application is X, and the roaming operation device and the home operation device perform three rounds of roaming services in the duration X. In this case, three rounds of charging data record files are correspondingly generated. The three rounds of charging data record files are respectively a charging data record file 1, a charging data record file 2, and a charging data record file 3 in a time sequence.

An SMF in the roaming operation device sends each round of charging data record file to a CHF in the roaming operation device by using a charging trigger function (CTF). After collating the at least one round of charging data record file (for example, the three rounds of charging data record files) provided by the SMF, the CHF sorts out the charging data record file in the duration X according to a roaming agreement (for example, a charging data record segmentation format and charging data record content in the roaming agreement), and sends the charging data record file to a BD of the roaming operation device.

S401: The home operation device determines a charging data record file generated when a roaming service is performed in a roaming area network in the threshold duration.

In an implementation of this embodiment of this application, the home operation device may generate at least one round of charging data record file at the roaming location in the threshold duration. For example, it is assumed that the threshold duration in this embodiment of this application is X, and the roaming operation device and the home operation device perform the three rounds of roaming services in the duration X, the three rounds of charging data record files are correspondingly generated.

The three rounds of charging data record files are respectively a charging data record file 1, a charging data record file 2, and a charging data record file 3 in a time sequence. An SMF in the home operation device sends each round of charging data record to a CHF in the home operation device. After collating the at least one round of charging data record file provided by the SMF, the CHF sorts out the charging data record file in the current duration according to the roaming agreement (for example, the charging data record segmentation format and the charging data record content in the roaming agreement), and sends the charging data record file to a BD of the home operation device.

It should be noted that in this embodiment of this application, a sequence of S400 and S401 is not limited.

S402: The roaming operation device determines a charging data record statement based on the charging data record file.

Figure 5:
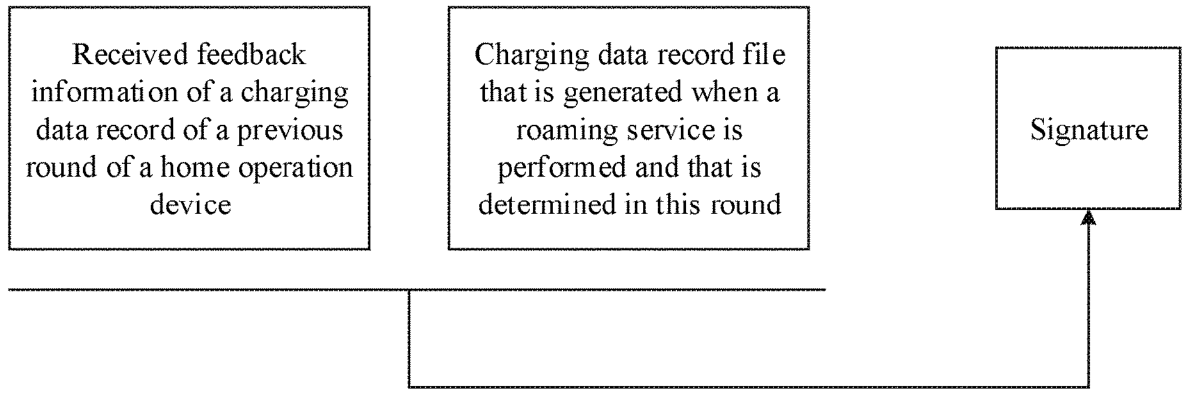
FIG. 5 is a schematic diagram of content of a signed file according to this application.

If the charging data record file is a first round of roaming record in a process of performing the roaming service in the threshold duration, the charging data record statement includes the signed charging data record file. If the charging data record file is not the first round of roaming record in the process of performing the roaming service in the threshold duration, as shown in FIG. 5, the charging data record statement includes the signed charging data record file and feedback information of a charging data record of a previous round of the home operation device.

The feedback information of the charging data record file indicates a check result of the charging data record file, and if it is checked that the charging data record file is valid, the feedback information of the charging data record file includes a signature of the second network device. Therefore, the roaming operation device can be effectively associated with charging data record files of a plurality of rounds generated when the home operation device performs the roaming service, which facilitates overall management of the charging data record file and facilitates subsequent fetching and tracing of the charging data record file.

In an optional implementation of this embodiment of this application, to ensure security of the charging data record statement, the charging data record statement may be encrypted or hashed.

S403: The roaming operation device determines a roaming fee corresponding to each round of the charging data record file according to the roaming agreement, and generates a currency statement based on the roaming fee.

Further, the roaming operation device generates, based on the roaming fee, a currency statement of a corresponding limit and currency verification information corresponding to the currency statement.

For example, it is assumed that the three rounds of charging data record files are generated in the threshold duration, namely, the charging data record files 1 to 3. The roaming operation device may separately determine, according to the roaming agreement, the roaming fee corresponding to each round of charging data record files. For example, the charging data record file 1 corresponds to a roaming fee 1, the charging data record file 2 corresponds to a roaming fee 2, and the charging data record file 3 corresponds to a roaming fee 3.

Further, the roaming operation device generates, based on the roaming fees 1 to 3, a currency statement of a corresponding limit and currency verification information corresponding to the currency statement. For example, the roaming operation device generates (C1, S1, r1) based on the roaming fee 1, generates (C2, S2, r2) based on the roaming fee 1, and generates (C3, S3, r3) based on the roaming fee 1. To be specific, a currency statement C1 is used to represent a roaming fee corresponding to the charging data record file 1, a currency statement C2 represents a roaming fee corresponding to the charging data record file 2, and a currency statement C3 represents a roaming fee corresponding to the charging data record file 3.

S404: The roaming operation device stores, in a blockchain, the currency statement corresponding to each round of charging data record file and the charging data record statement, records storage addresses of the currency statement and the charging data record statement in the blockchain, and securely stores the currency verification information in the BD of the roaming operation device.

S405: The roaming operation device sends the charging data record file and the storage address of the currency statement in the blockchain to the home operation device.

Optionally, the roaming operation device may send the charging data record file and the currency statement to the home operation device.

Optionally, the roaming operation device may send the charging data record file that includes the storage address of the currency statement to the home operation device.

S406: The home operation device performs charging data record file verification.

In this embodiment of this application, when the home operation device performs charging data record verification, there may be two cases.

Case 1: In a home routed mode, on a premise that the home operation device has obtained a locally recorded charging data record file, the home operation device determines whether the received charging data record file sent by the roaming operation device basically matches the locally recorded charging data record file. The home operation device obtains, based on received address information of the currency statement in the blockchain, the corresponding currency statement stored in the blockchain, determines whether the currency statement is compliant with the roaming agreement, and checks whether a charging data record file in a transaction statement in the blockchain is compliant with the charging data record file sent by the roaming operation device.

Case 2: In local breakout, the home operation device obtains, based on the received address information of the currency statement in the blockchain, the corresponding currency statement stored in the blockchain, determines whether the currency statement is compliant with the roaming agreement, and checks whether the charging data record file in the transaction statement in the blockchain is compliant with a hash result of the charging data record file sent by the roaming operation device.

In this embodiment of this application, to ensure security of the charging data record file, the charging data record file stored in the blockchain is an encrypted or hashed charging data record file, and the charging data record file sent by the roaming operation device to the home operation device is also an encrypted or hashed charging data record file. Therefore, during verification, for example, hashing is used. It is determined whether a hashed charging data record file in a transaction record stored in the blockchain is consistent with the hash result of the charging data record file sent by the roaming operation device to the home operation device.

S407: The home operation device sends the feedback information of the charging data record file to the roaming operation device based on a charging data record file verification result.

The feedback information that is of the charging data record file and that is sent by the home operation device to the roaming operation device varies with the charging data record file verification result, and is not limited to the following several cases.

Case 1: If the home operation device determines, by performing verification on the charging data record file, that the charging data record file is a valid charging data record file, the feedback information of the charging data record file includes the signature of the second network device. To be specific, it indicates that the home operation device acknowledges the charging data record file.

Case 2: If the home operation device determines, by performing verification on the charging data record file, that the charging data record file is an invalid charging data record file, the feedback information of the charging data record file may include charging data record file renegotiation information. To be specific, the home operation device does not acknowledge the charging data record file, and needs to reconfirm and negotiate with the roaming operation device about the charging data record file.

The following is steps in which the home operation device pays a roaming fee of a terminal.

S408: The home operation device selects a first currency statement of the roaming operation device for payment, where the selected first currency statement is an invalid currency that has not been paid.

In this embodiment of this application, there are a plurality of manners in which the home operation device selects the first currency statement for the payment. This is not limited to the following several manners.

Selection manner 1: The first currency statement is selected from a plurality of currency statements that have not been paid in the roaming operation device for the payment.

For example, it is assumed that the plurality of currency statements of the roaming operation device stored in the blockchain include a currency statement C11, a currency statement C12, a currency statement C13, and a currency statement C14. Currencies corresponding to the currency statements C11 to C14 are invalid currencies, but the currency corresponding to the currency statement C11 is an invalid currency that has been paid, and the currencies corresponding to the currency statements C12 to C14 are invalid currencies that have not been paid. Therefore, the home operation device selects the currency statement C14 from the currency statements C12 to C14 for the payment. It is assumed that the first currency statement selected by the home operation device is the currency statement C14.

Selection manner 2: The first currency statement with longest payment-pending duration is selected from currency statements that have not been paid in the roaming operation device for the payment. The payment-pending duration may be represented as duration from a time when the currency statement is initially recorded in the blockchain to a current time.

For example, it is assumed that the currency statement that has not been paid and that is corresponding to the roaming operation device and that is stored in the blockchain includes the currency statement C11, the currency statement C12, and the currency statement C13. Payment-pending duration of the currency statement C11 is 1s, payment-pending duration of the currency statement C12 is 2s, and payment-pending duration of the currency statement C13 is 3s. Because the pending payment duration of the currency statement C13 is the longest, the home operation device selects the currency statement C13 for the payment, that is, the first currency statement selected by the home operation device is the currency statement C13.

Selection manner 3: The home operation device selects, based on a valid second currency statement held by the home operation device, the first currency statement for the payment. A selection criterion may be that an amount of the selected first currency statement is less than or equal to an amount of the second currency statement.

S409: The home operation device selects the second currency statement from currency statements held by the home operation device to pay for the selected first currency statement, where the second currency statement is a valid currency statement held by the home operation device.

A value corresponding to the second currency statement selected by the home operation device is not less than a value corresponding to the selected first currency statement.

For example, it is assumed that the first currency statement selected by the home operation device for the payment is the currency statement C14, and a value of a currency corresponding to the currency statement C14 is "100". The second currency statement held by the home operation device includes currency statements C21 to C25, and corresponding values of currencies are "50".

Therefore, the home operation device may select two currency statements C from the currency statements C21 to C25 held by the home operation device to pay for the currency statement C14. For example, the home operation device selects the currency statement C22 and the currency statement C25 held by the home operation device to pay for the currency statement C14.

S410: After completing the payment, the home operation device generates corresponding completion information of the payment.

Optionally, the completion information of the payment indicates that the home operation network device states that the payment for the selected first currency is completed, and the completion information of the payment includes a transaction address for performing the payment by using the second currency statement.

Optionally, in this embodiment of this application, the payment complete message includes a privacy sequence number S and a ZKP that correspond to the currency statement selected by the home operation device. In this embodiment of this application, the currency statement may be determined based on ZKP. For example, a hidden random value r corresponding to the currency statement C is determined, so that f(S, r)=C.

Further, in this embodiment of this application, a value of the currency statement C of the home operation device is not exposed, and the privacy sequence number S corresponding to the currency statement C is never recorded in the blockchain, that is, a currency corresponding to the currency statement C is not used.

Further, the ZKP in the home operation device may be directly associated with unique identification information of a selected currency statement C of the roaming operation device. The unique identification information may be the currency statement C or a storage address of the currency statement C in the blockchain.

Further, the ZKP in the home operation device associates a corresponding charging data record file. If the charging data record file corresponding to the charging data record statement is not a first round of charging data record file in the threshold duration, the charging data record statement further includes completion information of payment fed back by the home operation device in a previous round. Therefore, charging data record files of a plurality of rounds in the roaming process in the threshold duration may be associated with each other by association in S410. Therefore, a complete roaming event can be obtained during subsequent tracing and accountability.

S411: The home operation device sends the generated completion information of the payment to the blockchain.

Optionally, in this embodiment of this application, a storage address of the completion information of the payment in the blockchain is recorded, so that the storage address of the completion information of the payment in the blockchain is subsequently sent to the roaming operation device, so that the roaming operation device queries a blockchain record to perform verification by using the storage address of the completion information of the payment in the blockchain.

S412: The blockchain performs validity review on the completion information of the payment.

In this embodiment of this application, the blockchain mainly determines, in the following manners, that the completion information of the payment is valid.

The blockchain determines that the value of the second currency statement selected by the home operation device is not greater than the value of the first currency statement selected by the home operation device, the blockchain determines that a privacy sequence number S corresponding to the first currency statement selected by the home operation device is not used in a valid historical transaction record, and the blockchain determines that a currency corresponding to the first currency statement selected by the home operation device is a valid currency.

S413: After the blockchain determines that the completion information of the payment is valid, the blockchain synchronizes the completion information of the payment of this time to a network.

Further, after the blockchain determines that the completion information of the payment is valid and synchronizes the completion information of the payment of this time to the entire network, it also means that a corresponding currency statement recorded in a previous initial mintage process of the roaming operation device takes effect, an invalid currency is changed to a valid currency, and mintage is completed.

S414: The home operation device feeds back the completion information of the payment to the roaming operation device.

Optionally, the home operation device may further send the storage address of the completion information of the payment in the blockchain to the roaming operation device.

In this embodiment of this application, the completion information of the payment fed back by the home operation device to the roaming operation device is a signature of a charging data record file completed in this round, to indicate that the home operation device checks the charging data record file in this round, and further needs to include a recording address of the first currency statement in the blockchain selected by the home operation device, to facilitate query by the roaming operation device.

Optionally, in this embodiment of this application, the feedback information may further include other information, for example, information about UE whose roaming service is modified and tariff dispute information.

It should be noted that, in this embodiment of this application, after each round ends, both the home operation device and the roaming operation device have a same charging data record file plaintext and signatures of both parties. The signature of the roaming operation device is mainly for the charging data record file of this round, and the signature of the home operation device is mainly for a charging data record file of the previous round.

Optionally, in this embodiment of this application, the home operation device and the roaming operation device both securely buffer detailed content of the charging data record file until there is no arbitration requirement for the corresponding charging data record file.

S415: The roaming operation device queries the blockchain for a payment transaction corresponding to the first currency statement, and determines that the currency corresponding to the first currency statement is a valid currency.

In this embodiment of this application, after the currency that is corresponding to the first currency statement and that is stored in the blockchain by the roaming operation device changes from an invalid currency to a valid currency, it is proved that the roaming operation device successfully performs mintage. In a subsequent roaming transaction, the roaming operation device may perform the payment by using the currency corresponding to the first currency statement.

Phase 3: After Roaming.

In this embodiment of this application, after roaming fee payment and a charging data record file transaction are completed, there may be a plurality of cases based on whether there is an objection between both parties.

Case 1: If there is no objection between a roaming operation device and a home operation device, a roaming service of this time is terminated.

Optionally, in this embodiment of this application, to save storage space of a blockchain, the roaming operation device, and the home operation device, when the roaming operation device and the home operation device complete the roaming service and there is no objection between both parties, redundant files stored in the blockchain and/or the devices of both parties may be deleted.

Figure 6:
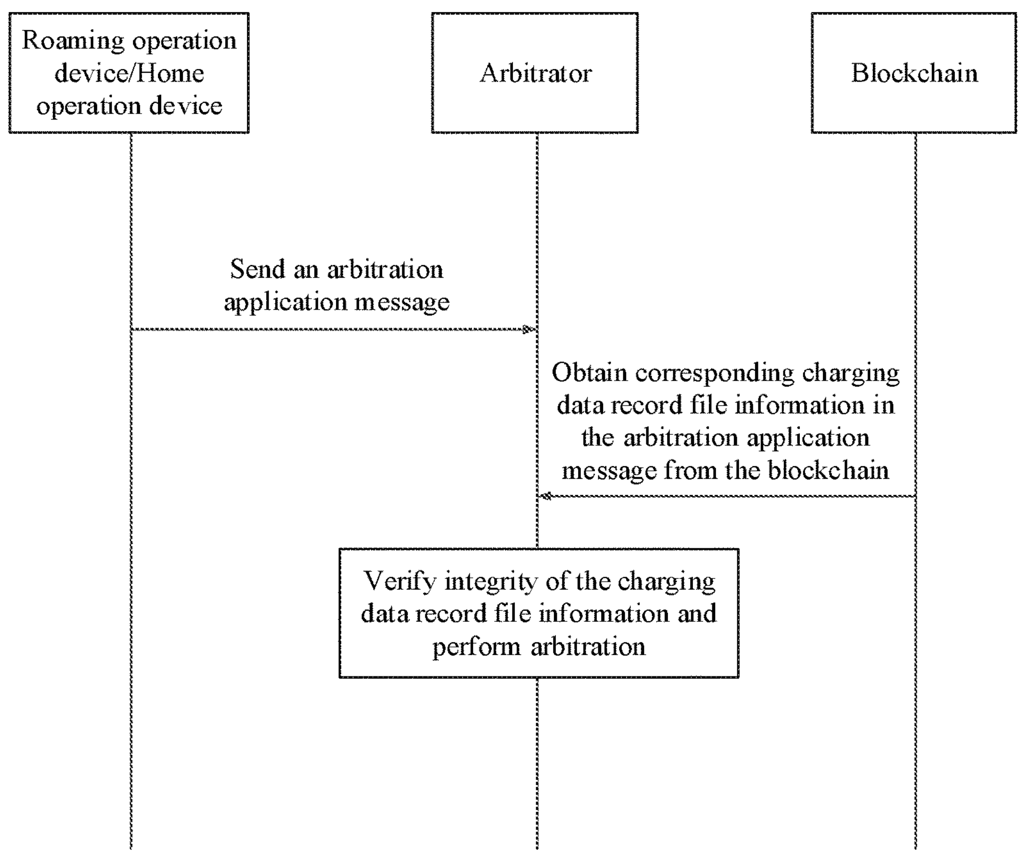
FIG. 6 is a schematic diagram in which a roaming operation device and/or a home operation device apply/applies to an arbitrator for arbitration according to this application.

Case 2: If both parties or one party of the roaming operation device and the home operation device disagree, as shown in FIG. 6, the roaming operation device and/or the home operation device may perform arbitration.

Further, in this embodiment of this application, if the home operation device and/or the roaming operation device perform/performs arbitration, an arbitration applicant needs to present valid charging data record content to maintain rights and interests of the arbitration applicant.

In an implementation of this embodiment of this application, a BD of the arbitration applicant initiating an arbitration application sends an arbitration application message to an arbitration party. The arbitration application message includes a to-be-arbitrated charging data record file, a storage location of the charging data record file in the blockchain, and a signature provided by the home operation device in a next round of charging data record file.

If the signature of the home operation device is involved in this embodiment of this application, the arbitration application message further needs to include related content of a next round, to ensure that the signature of the home operation device is recorded in a blockchain in a roaming service process.

Optionally, in this embodiment of this application, from a perspective of privacy protection, charging data record files recorded in the blockchain are hash results obtained after the charging data record files are hashed. However, in this embodiment of this application, when performing arbitration, the arbitration applicant needs to prove, to a third-party arbitrator, that a hash result recorded in the blockchain includes information that requires arbitration support. For example, the arbitration applicant claims that a service has been provided at a specific time.

Therefore, the arbitration application message sent to the arbitrator by the BD of the arbitration applicant initiating the arbitration application includes the to-be-arbitrated charging data record file, verification information used for verifying a hash result corresponding to the charging data record file in the blockchain, and a storage location of the hash result of the charging data record file in the blockchain.

Further, in this embodiment of this application, the arbitrator obtains, from the blockchain based on the storage location of the charging data record file in the blockchain in the arbitration application message, charging data record file information stored in the blockchain, and verifies integrity of the charging data record file information.

In an implementation, the arbitrator in this embodiment of this application may verify integrity of the charging data record file information in the following manner.

First, it is determined, according to a public hash algorithm, that a charging data record statement record recorded in the blockchain is indeed a hash result of to-be-arbitrated content, to ensure real existence of generated charging data record. Second, correctness of the signature is verified, to ensure that a charging data record recorded in the blockchain is recognized by both transaction parties at that time.

After the foregoing verification is passed, if the arbitrator confirms that the BD of the arbitration applicant presents authentic and valid charging data record information, the arbitrator arbitrates a roaming event based on a settled roaming contract and local laws and regulations.

Based on the foregoing description of the solutions in this application, it may be understood that, to implement the foregoing functions, the foregoing devices include corresponding hardware structures and/or software modules for executing the functions. Persons skilled in the art may be easily aware that, units and algorithm steps of each example described in combination with the embodiments disclosed in the specification may be implemented by hardware, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
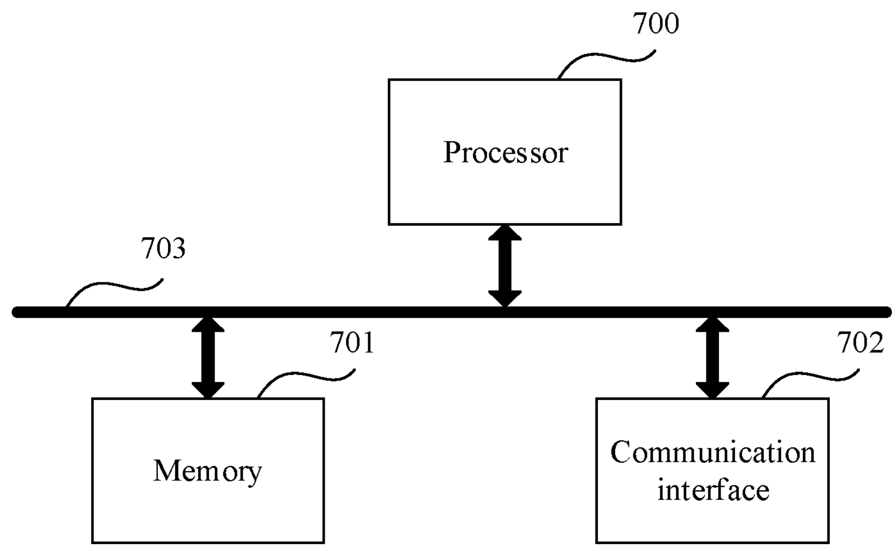
FIG. 7 is a first schematic diagram of a network device in a roaming area network according to this application.

Based on the foregoing embodiments, as shown in FIG. 7, this application provides a network device. The network device is located in the roaming area network, and the network device includes a processor 700, a memory 701, and a communication interface 702.

The processor 700 is responsible for managing a bus architecture and general processing, and the memory 701 may store data used when the processor 700 performs an operation. The transceiver communication interface 702 is configured to receive and send data under control of the processor 700, and perform data communication with the memory 701.

The processor 700 may be a central processing unit (CPU), a network processor (NP), or a combination of a CPU and an NP. The processor 700 may further include a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof. The memory 701 may include any medium that can store program code, such as a Universal Serial Bus (USB) flash drive, a removable hard disk, a read-only memory (ROM), a random-access memory (RAM), a magnetic disk, or an optical disc.

The processor 700, the memory 701, and the communication interface 702 are connected to each other. Optionally, the processor 700, the memory 701, and the communication interface 702 may be connected to each other by using a bus 703. The bus 703 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is used to represent the bus in FIG. 7, but this does not mean that there is only one bus or only one type of bus.

Further, the processor 700 is configured to read a program in the memory 701 and execute the program to perform the following operations of sending a charging data record file to a second network device, where the charging data record file is a roaming communication record of a terminal device, and a first network device is located in a roaming area network of the terminal device, publishing a currency statement to a blockchain, where the currency statement indicates a roaming fee corresponding to the charging data record file, and receiving feedback information of the charging data record file from the second network device.

In a possible implementation, the processor 700 is further configured to determine the charging data record file generated when the terminal device performs a roaming service.

In a possible implementation, the processor 700 is further configured to determine the roaming fee corresponding to the charging data record file according to a roaming agreement signed with the second network device.

In a possible implementation, the currency statement is generated by the first network device based on the roaming fee by using a mintage process.

In a possible implementation, the currency statement further includes currency verification information, and the currency verification information corresponds to a unique currency statement and is used to determine whether payment for the currency statement in the blockchain is completed.

In a possible implementation, the processor 700 is further configured to send the charging data record file to the second network device.

In a possible implementation, the processor 700 is further configured to determine a charging data record statement based on the charging data record file, and publish the charging data record statement and the currency statement to the blockchain.

In a possible implementation, the processor 700 is further configured to sign the charging data record file, and determine the charging data record statement based on the signed charging data record file.

In a possible implementation, the processor 700 is further configured to publish the charging data record statement to the blockchain after encryption or hashing.

In a possible implementation method, the processor 700 is configured to send any one or more of the following to the second network device: feedback information of a charging data record of a previous round, a signature of the first network device, and an address of the currency statement in the blockchain.

In a possible implementation, the feedback information of the charging data record file indicates a check result of the charging data record file, and if it is checked that the charging data record file is valid, the feedback information of the charging data record file includes a signature of the second network device.

Figure 8:
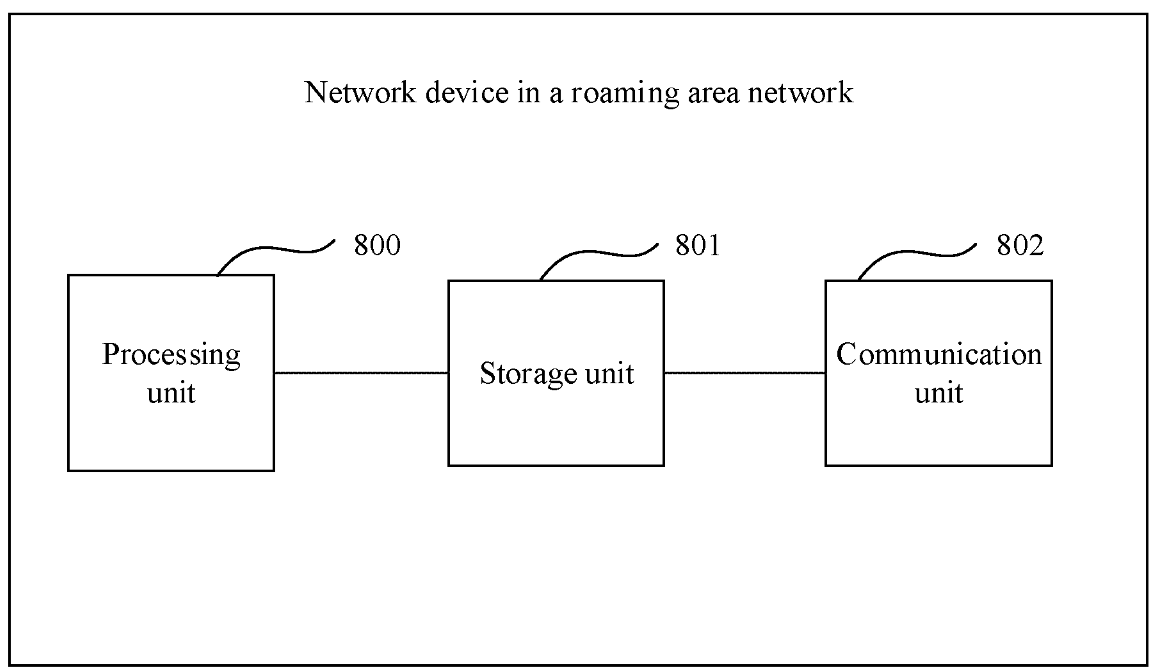
FIG. 8 is a second schematic diagram of a network device in a roaming area network according to this application.

As shown in FIG. 8, this application provides a network device. The network device is located in a roaming area network. The network device includes at least one processing unit 800, at least one storage unit 801, and at least one communication unit 802. The communication unit 802 is configured to receive and send data under control of the processing unit 800. The storage unit 801 stores program code. When the program code is executed by the processing unit 800, the processing unit 800 performs the following process.

The communication unit 802 is configured to send a charging data record file to a second network device. The charging data record file is a roaming communication record of a terminal device, and a first network device is located in a roaming area network of the terminal device.

The processing unit 800 is used by the first network device to publish a currency statement to a blockchain. The currency statement indicates a roaming fee corresponding to the charging data record file.

The communication unit 802 is configured to receive feedback information of the charging data record file from the second network device.

In a possible implementation, the processing unit 800 is further configured to determine the charging data record file generated when the terminal device performs a roaming service.

In a possible implementation, the processing unit 800 is further configured to determine the roaming fee corresponding to the charging data record file according to a roaming agreement signed with the second network device.

In a possible implementation, the currency statement is generated by the first network device based on the roaming fee by using a mintage process.

In a possible implementation, the currency statement further includes currency verification information, and the currency verification information corresponds to a unique currency statement and is used to determine whether payment for the currency statement in the blockchain is completed.

In a possible implementation, the communication unit 802 is further configured to send the charging data record file to the second network device.

In a possible implementation, the processing unit 800 is further configured to determine a charging data record statement based on the charging data record file, and publish the charging data record statement and the currency statement to the blockchain.

In a possible implementation, the processing unit 800 is further configured to sign the charging data record file, and determine the charging data record statement based on the signed charging data record file.

In a possible implementation, the processing unit 800 is further configured to publish the charging data record statement to the blockchain after encryption or hashing.

In a possible implementation method, the communication unit 802 sends any one or more of the following to the second network device: feedback information of a charging data record of a previous round, a signature of the first network device, and an address of the currency statement in the blockchain.

In a possible implementation, the feedback information of the charging data record file indicates a check result of the charging data record file, and if it is checked that the charging data record file is valid, the feedback information of the charging data record file includes a signature of the second network device.

Figure 9:
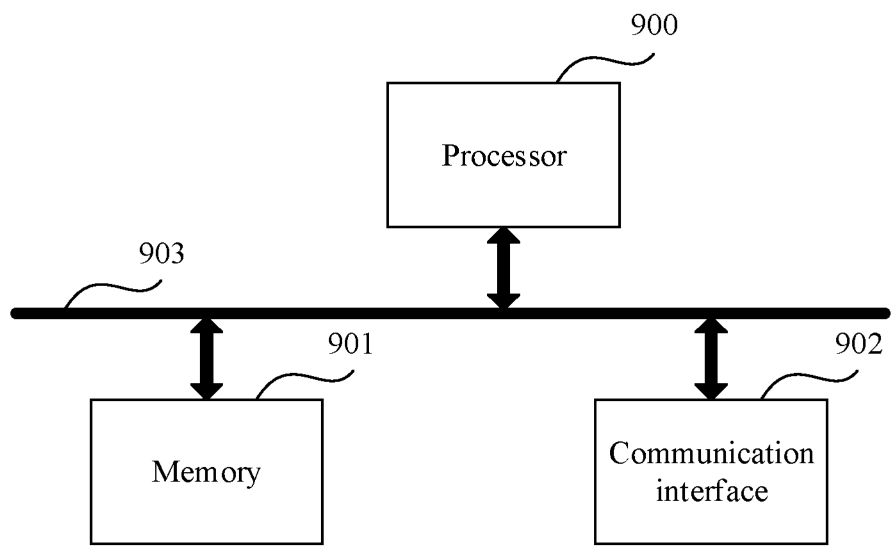
FIG. 9 is a first schematic diagram of a network device in a subscription area network according to this application.

As shown in FIG. 9, an embodiment of this application further provides a network device. The network device is located in a subscription area network of a terminal device. The network device includes a processor 900, a memory 901, and a communication interface 902.

The processor 900 is responsible for managing a bus architecture and general processing, and the memory 901 may store data used when the processor 900 performs an operation. The transceiver communication interface 902 is configured to receive and send data under control of the processor 900, and perform data communication with the memory 901.

The processor 900 may be a CPU, an NP, or a combination of a CPU and an NP. The processor 900 may further include a hardware chip. The hardware chip may be an ASIC, a PLD, or a combination thereof. The PLD may be a CPLD, an FPGA, a GAL, or any combination thereof. The memory 901 may include any medium that can store program code, such as a USB flash drive, a removable hard disk, a ROM, a RAM, a magnetic disk, or an optical disc.

The processor 900, the memory 901, and the communication interface 902 are connected to each other. Optionally, the processor 900, the memory 901, and the communication interface 902 may be connected to each other by using a bus 903. The bus 903 may be a PCI bus, an EISA bus, or the like. The bus may be classified into an address bus, a data bus, a control bus, and the like. For ease of representation, only one bold line is used to represent the bus in FIG. 9, but this does not mean that there is only one bus or only one type of bus.

Further, the processor 900 is configured to read a program in the memory 901 and execute the program to perform the following operations selecting a first currency statement for payment, where the first currency statement is a roaming fee to be paid by a second network device, and completing the payment for the first currency statement, and sending completion information of the payment to a first network device, where the first network device is located in a roaming area network of the terminal device.

In a possible implementation, the processor 900 is further configured to select, based on a valid second currency statement held by the second network device, the first currency statement for the payment, where an amount of the first currency statement is less than or equal to that of the second currency statement, or select the first currency statement from a plurality of currency statements.

In a possible implementation, the processor 900 is further configured to send the completion information of the payment to a blockchain.

In a possible implementation, the processor 900 is further configured to receive a storage address of the first currency statement in the blockchain from the first network device.

In a possible implementation, the processor 900 is further configured to select the first currency statement for the payment from the blockchain based on the received storage address.

In a possible implementation, the processor 900 is further configured to send a storage address of the completion information of the payment in the blockchain to the first network device.

In a possible implementation, the completion information of the payment indicates that the second network device completes the payment for the first currency statement, and the completion information of the payment includes a transaction address for performing payment by the second currency statement.

Figure 10:
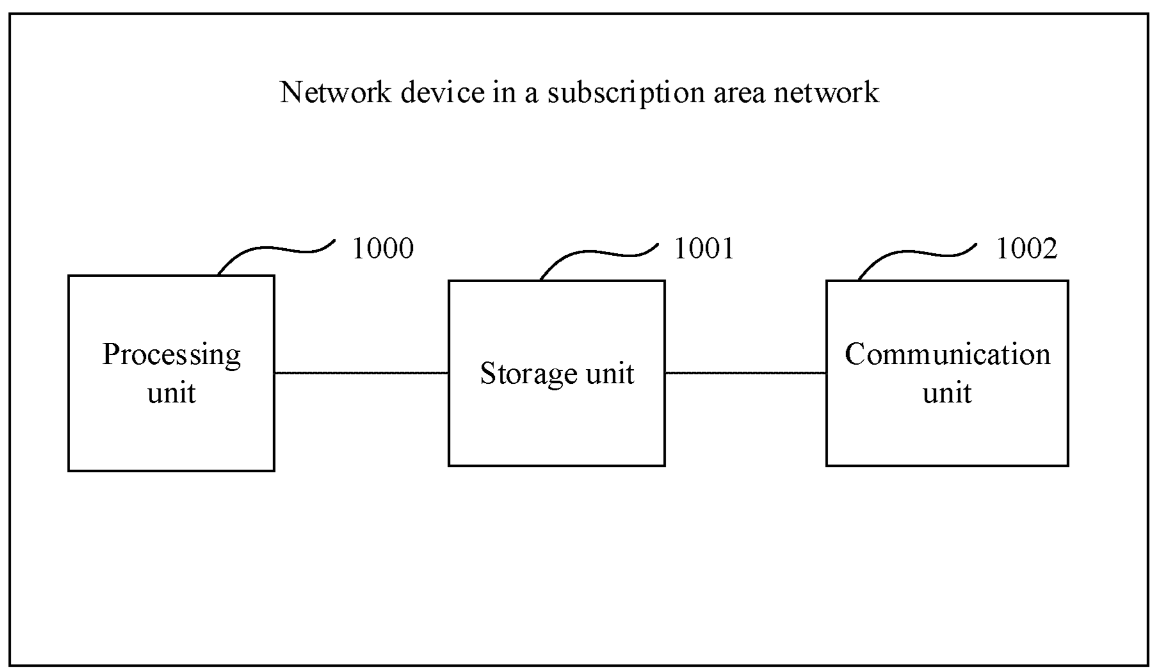
FIG. 10 is a second schematic diagram of a network device in a roaming area network according to this application.

As shown in FIG. 10, this application provides a network device. The network device is located in a subscription area network of a terminal device. The network device includes at least one processing unit 1000, at least one storage unit 1001, and at least one communication unit 1002. The communication unit 1002 is configured to receive and send data under control of the processing unit 1000. The storage unit 1001 stores program code. When the program code is executed by the processing unit 1000, the processing unit 1000 performs the following process.

The processing unit 1000 is configured to select a first currency statement for payment, where the first currency statement is a roaming fee to be paid by a second network device, and complete the payment for the first currency statement.

The communication unit 1002 is configured to send completion information of the payment to a first network device. The first network device is located in a roaming area network of the terminal device.

In a possible implementation, the processing unit 1000 is further configured to select, based on a valid second currency statement held by the second network device, the first currency statement for the payment, where an amount of the first currency statement is less than or equal to that of the second currency statement, or select the first currency statement from a plurality of currency statements.

In a possible implementation, the communication unit 1002 is further configured to send the completion information of the payment to a blockchain.

In a possible implementation, the communication unit 1002 is further configured to receive a storage address of the first currency statement in the blockchain from the first network device.

In a possible implementation, the processing unit 1000 is further configured to select the first currency statement for the payment from the blockchain based on the received storage address.

In a possible implementation, the communication unit 1002 is further configured to send a storage address of the completion information of the payment in the blockchain to the first network device.

In a possible implementation, the completion information of the payment indicates that the second network device completes the payment for the first currency statement, and the completion information of the payment includes a transaction address for performing payment by the second currency statement.

In some possible implementations, aspects of the method for supporting a roaming service based on a blockchain provided in the embodiments of this application may be further implemented in a form of a program product, including program code. When the program code is run on a computer device, the program code is used to enable the computer device to perform the steps in the method for supporting a roaming service based on a blockchain described in this specification according to various example implementations of this application.

The program product may be any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus or device, or any combination thereof. More specific examples (non-exhaustive list) of the readable storage medium in this embodiment of this application include an electrical connection having one or more conducting wires, a portable disk, a hard disk, a RAM, a ROM, an erasable programmable ROM (EPROM or flash memory), an optical fiber, a portable compact disc (CD) ROM (CD-ROM), an optical storage device, a magnetic storage device, or any appropriate combination thereof.

According to an implementation of this application, a program product used to support a roaming service based on a blockchain may use a portable CD-ROM, include program code, and may be run on a server device. However, the program product in this application is not limited thereto. In this specification, the readable storage medium may be any tangible medium that includes or stores a program. The program may be used by information transmission, an apparatus, or a device, or used in combination with the program.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of this application may be written in any combination of one or more program design languages. The program design languages include object-oriented program design languages such as JAVA and C++, and further include a procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or a server. When the program code is executed on the remote computing device, the remote computing device may be connected to the computing device of the user by using any type of network, including a local area network (LAN) or a wide area network (WAN), or may be connected to an external computing device.

The embodiments of this application further provide a computing device-readable storage medium for the method for supporting a roaming service based on a blockchain. In other words, content is not lost after a power failure. The storage medium stores a software program, including program code. When the program code is run on a computing device, and the software program is read and executed by one or more processors, any one of the foregoing solutions of supporting a roaming service based on a blockchain in the embodiments of this application can be implemented.

The foregoing describes this application with reference to the block diagrams and/or flowcharts of the method, the apparatus (system), and/or the computer program product in the embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a special-purpose computer, and/or another programmable data processing apparatus to produce a machine, so that the instructions executed by the processor of the computer and/or the other programmable data processing apparatus create a method for implementing a specified function/action in a block in the block diagrams and/or flowcharts.

Correspondingly, this application may be further implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, so that the computer-usable or computer-readable is used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. Obviously, persons skilled in the art can make various modifications and variations to this application without departing from the scope of this application. This application is intended to cover these modifications and variations of this application provided that they fall within the scope of the claims of this application and their equivalent technologies.

What is claimed is:

1. A method implemented by a first network device, wherein the method comprises:

sending, to a second network device, a charging data record file that is a roaming communication record of a terminal device, wherein the first network device is located in a roaming area network of the terminal device;

publishing, to a blockchain, a currency statement indicating a roaming fee corresponding to the charging data record file, wherein the roaming fee is a charge indicating the terminal device performed a roaming service; and receiving, from the second network device, first feedback information of the charging data record file, wherein the first feedback information indicates a check result of the charging data record file, and wherein the first feedback information comprises a signature of the second network device when the check result indicates the charging data record file is valid.

2. The method of claim 1, wherein before sending the charging data record file, the method further comprises determining the charging data record file when the terminal device performs the roaming service.

3. The method of claim 1, wherein before publishing the currency statement, the method further comprises determining, according to a roaming agreement signed with the second network device, the roaming fee.

4. The method of claim 1, further comprising generating, based on the roaming fee and using a mintage process, the currency statement.

5. The method of claim 1, wherein the currency statement comprises currency verification information corresponding to a unique currency statement, and wherein the currency verification information is for determining whether a payment for the currency statement is completed.

6. The method of claim 1, further comprising:

determining, based on the charging data record file, a charging data record statement; and publishing, to the blockchain, the charging data record statement.

7. The method of claim 6, further comprising:

signing the charging data record file to obtain a signed charging data record file; and further determining, based on the signed charging data record file, the charging data record statement.

8. The method of claim 7, further comprising further publishing, to the blockchain and after encryption or hashing, the charging data record statement.

9. The method of claim 1, further comprising sending, to the second network device, one or more of second feedback information of a charging data record of a previous round, a signature of the first network device, or an address of the currency statement in the blockchain.

10. The method of claim 4, wherein the mintage process comprises:

generating an invalid currency; and changing the invalid currency to a valid currency after payment is completed.

11. A first network device located in a roaming area network of a terminal device and comprising:

a transceiver configured to:

send, to a second network device, a charging data record file that is a roaming communication record of the terminal device; and receive, from the second network device, first feedback information of the charging data record file, wherein the first feedback information indicates a check result of the charging data record file, and wherein the first feedback information comprises a signature of the second network device when the check result indicates the charging data record file is valid; and one or more processor coupled to the transceiver and configured to publish, to a blockchain, a currency statement indicating a roaming fee corresponding to the charging data record file, wherein the roaming fee is a charge indicating the terminal device performed a roaming service.

12. The first network device of claim 11, wherein the one or more processors are further configured to determine the charging data record file when the terminal device performs the roaming service.

13. The first network device of claim 11, wherein the one or more processors are further configured to determine, according to a roaming agreement signed with the second network device, the roaming fee.

14. The first network device of claim 11, wherein the one or more processors are further configured to generate, based on the roaming fee and using a mintage process, the currency statement.

15. The first network device of claim 14, wherein the one or more processors are further configured to:

generate an invalid currency; and change the invalid currency to a valid currency after payment is completed.

16. The first network device of claim 11, wherein the currency statement further comprises currency verification information corresponding to a unique currency statement, and wherein the currency verification information is for determining whether payment for the currency statement in the blockchain is completed.

17. The first network device of claim 11, wherein the one or more processors are further configured to:

sign the charging data record file to obtain a signed charging data record file;

determine, based on the signed charging data record file, a charging data record statement; and publish, to the blockchain, the charging data record statement.

18. The first network device of claim 17, wherein the one or more processors are further configured to further publish, to the blockchain and after encryption or hashing, the charging data record statement.

19. The first network device of claim 11, wherein the transceiver is further configured to send, to the second network device, one or more of second feedback information of a charging data record of a previous round, a signature of the first network device, or an address of the currency statement.

20. A computer program product comprising computer-executable instructions that are stored on a non-transitory computer-readable medium and that, when executed by one or more processors, cause a first network device to:

send, to a second network device, a charging data record file that is a roaming communication record of a terminal device, wherein the first network device is located in a roaming area network of the terminal device;

publish, to a blockchain, a currency statement indicating a roaming fee corresponding to the charging data record file, wherein the roaming fee is a charge indicating the terminal device performed a roaming service; and receive, from the second network device, feedback information of the charging data record file wherein the feedback information indicates a check result of the charging data record file, and wherein the feedback information comprises a signature of the second network device when the check result indicates the charging data record file is valid.

* * * * *